US010091364B2

(12) United States Patent
Gao et al.

(10) Patent No.: US 10,091,364 B2
(45) Date of Patent: Oct. 2, 2018

(54) REVERSE POWER SUPPLY METHOD AND REVERSE POWERING EQUIPMENT AND SYSTEM

(71) Applicant: Huawei Technologies Co., Ltd., Shenzhen, Guangdong (CN)

(72) Inventors: Xingguo Gao, Shenzhen (CN); Dong Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 330 days.

(21) Appl. No.: 15/061,339

(22) Filed: Mar. 4, 2016

(65) Prior Publication Data

US 2016/0255207 A1 Sep. 1, 2016

Related U.S. Application Data

(63) Continuation of application No. PCT/CN2013/082973, filed on Sep. 5, 2013.

(51) Int. Cl.

| | |
|---|---|
| *H04M 1/00* | (2006.01) |
| *H04M 9/00* | (2006.01) |
| *H04M 19/08* | (2006.01) |
| *H04L 12/10* | (2006.01) |
| *H04B 3/44* | (2006.01) |
| *H04L 25/02* | (2006.01) |
| *H04B 10/077* | (2013.01) |
| *H04B 10/80* | (2013.01) |

(Continued)

(52) U.S. Cl.
CPC .............. *H04M 19/08* (2013.01); *H04B 3/44* (2013.01); *H04B 10/0775* (2013.01); *H04B 10/807* (2013.01); *H04L 12/10* (2013.01); *H04L 25/0282* (2013.01); *H04M 3/30* (2013.01); *H04M 19/04* (2013.01); *H04M 3/08* (2013.01)

(58) Field of Classification Search
CPC ..... H04M 19/08; H04B 3/44; H04B 10/0775; H04B 10/807

See application file for complete search history.

(56) References Cited

U.S. PATENT DOCUMENTS

| | | | |
|---|---|---|---|
| 5,287,555 A | 2/1994 | Wilson et al. | |
| 8,818,192 B1 * | 8/2014 | Smith | H04B 10/808 |
| | | | 398/171 |

(Continued)

FOREIGN PATENT DOCUMENTS

| | | |
|---|---|---|
| CN | 102655559 A | 9/2012 |
| CN | 103221832 A | 7/2013 |

(Continued)

*Primary Examiner* — Simon King

(57) ABSTRACT

Reverse powering equipment includes: a power supply module, configured to supply power resources to a distribution point unit by using a line; a switch, configured to control whether the power supply module supplies power; a line test module, configured to: when the switch is opened and the power supply module does not supply power, test whether a user terminal is connected to the line; and a system control module, configured to send an alarm signal when the line test module determines that a user terminal exists on the line, and after a user disconnects the user terminal, control the switch to be closed and the power supply module to supply power. The reverse powering equipment can prevent the user terminal from being damaged.

10 Claims, 4 Drawing Sheets

(51) Int. Cl.
*H04M 3/30* (2006.01)
*H04M 19/04* (2006.01)
H04M 3/08 (2006.01)

(56) References Cited

U.S. PATENT DOCUMENTS

| | | | | |
|---|---|---|---|---|
| 2010/0328087 | A1* | 12/2010 | Kanno | H04M 11/062 340/661 |
| 2014/0117774 | A1* | 5/2014 | McGill, Sr. | H04B 3/44 307/112 |
| 2014/0160600 | A1* | 6/2014 | Maggio | H02H 3/18 361/18 |

FOREIGN PATENT DOCUMENTS

| | | |
|---|---|---|
| EP | 0 600 644 A1 | 6/1994 |
| EP | 2 456 189 A1 | 5/2012 |
| EP | 2 911 339 A1 | 8/2015 |
| WO | WO 2012/117371 A1 | 9/2012 |

* cited by examiner

REVERSE POWER SUPPLY METHOD AND REVERSE POWERING EQUIPMENT AND SYSTEM

CROSS-REFERENCE TO RELATED APPLICATIONS

This application is a continuation of International Application No. PCT/CN2013/082973, filed on Sep. 5, 2013, which is hereby incorporated by reference in its entirety.

TECHNICAL FIELD

The present invention relates to the field of communications technologies, and in particular, to a reverse power supply method, and reverse powering equipment and a system that implement the method.

BACKGROUND

A reverse power supply technology is a technology named in a relative manner. A manner in which a switch supplies power to a network terminal and a current flows from the switch to the network terminal is usually referred to as forward power supply. A power supply manner in which the network terminal supplies power to the switch and a current flows from the terminal to the switch is referred to as reverse power supply.

In the prior art, in a fiber to the distribution point (FTTdp for short) network environment, because it is difficult for a distribution point (DP) to obtain power locally, supplying power to the DP becomes a main technical difficulty. One of the solutions is to supply power to the DP by using reverse powering equipment (RPE) in a user's home. Because a conventional twisted pair cabling mode in a home is tandem connection, if reverse power supply is connected to a point, a voltage is not only transmitted to the FTTdp but also transmitted to another point of interface of a line in the home. Conventionally, the other point of interface is generally a terminal device such as a phone. If the voltage is transmitted thereto in a case in which the user is not informed, some terminal devices such as a phone may be burnt.

SUMMARY

In view of this, embodiments of the present invention provide a reverse power supply method for a reverse power supply system, and reverse powering equipment and a system, so as to resolve the foregoing problem.

According to a first aspect, reverse powering equipment is provided, applied to a scenario in which reverse power supply is provided to a distribution point unit in a fiber to the distribution point network environment, including: a line, a power supply module, a switch, a line test module, and a system control module, where the line is configured to connect the reverse powering equipment and the distribution point unit, the switch has an end connected to the line, an end connected to the system control module, and an end connected to the power supply module, the power supply module has an end connected to the switch, and the line test module has an end connected to the line and an end connected to the system control module, where the power supply module is configured to supply power to the distribution point unit by using the line; the switch is configured to control whether the power supply module supplies power; the line test module is configured to: when the switch is opened and the power supply module does not supply power, test whether a user terminal is connected to the line; the system control module is configured to send an alarm signal when the line test module determines that a user terminal exists on the line, and after a user disconnects the user terminal, control the switch to be closed and the power supply module to supply power.

In a first possible implementation manner of the first aspect, the system control module is further configured to: when the line test module determines that no user terminal exists on the line, control the switch to be closed and the power supply module to supply power.

In a second possible implementation manner of the first aspect, the reverse powering equipment further includes a ringing current test module, configured to: when the line test module determines that no user terminal exists on the line, send a ringing current signal on the line.

In a third possible implementation manner of the first aspect, the system control module is further configured to: when no response to the ringing current signal sent by the ringing current test module is obtained, control the switch to be closed and the power supply module to supply power.

In a fourth possible implementation manner of the first aspect, the system control module is further configured to: when a response to the ringing current signal sent by the ringing current test module is obtained, after the user disconnects the user terminal, control the switch to be closed and the power supply module to supply power.

In a fifth possible implementation manner of the first aspect, the reverse powering equipment further includes a remote switch control module, configured to control the distribution point unit to obtain power from the line.

According to a second aspect, a reverse power supply method for a reverse power supply system is provided, where the reverse power supply system includes reverse powering equipment and a distribution point unit, where the reverse powering equipment is electrically connected to the distribution point unit by using a line, the method including: sending, by the reverse powering equipment, an alarm signal when the reverse powering equipment determines that a user terminal exists on the line, and skipping, by the reverse powering equipment, performing power supply.

In a first possible implementation manner of the second aspect, the method further includes: performing, by the reverse powering equipment, power supply on the line when the reverse powering equipment determines that no user terminal exists on the line.

In a second possible implementation manner of the second aspect, the performing, by the reverse powering equipment, power supply on the line when the reverse powering equipment determines that no user terminal exists on the line includes: when the reverse powering equipment detects that no user terminal exists on the line, sending, by the reverse powering equipment, a ringing current signal on the line; and when no response to the ringing current signal sent by the reverse powering equipment is obtained, performing, by the reverse powering equipment, power supply.

In a third possible implementation manner of the second aspect, the method further includes: when a response to the ringing current signal sent by the reverse powering equipment is obtained, skipping, by the reverse powering equipment, performing power supply, and after a user disconnects the user terminal, performing, by the reverse powering equipment, power supply.

According to a third aspect, a reverse power supply system is provided, including reverse powering equipment and a distribution point unit, where the reverse powering equipment is connected to the distribution point unit by using a line, the reverse powering equipment includes a first switch, a power supply module, a system control module, a remote switch control module, a line detection module, and a ringing current detection module; and the distribution point unit includes a second switch, a power obtaining module, a service module, and a switch power-on control circuit, where the power supply module is configured to supply power resources to the distribution point unit by using the line; the first switch is configured to control whether the power supply module supplies power; the line test module is configured to: when the switch is opened and the power supply module does not supply power, test whether a user terminal is connected to the line; the system control module is configured to send an alarm signal when the line test module determines that a user terminal exists on the line, and after the user disconnects the user terminal, control the switch to be closed and the power supply module to supply power; the second switch is configured to control the power obtaining module to obtain power from the line; the service module is configured to implement a service function of the distribution point unit; and the switch power-on control circuit is configured to control the second switch to be closed or opened, where the switch power-on control circuit is controlled by the remote switch control module of the reverse powering equipment.

According to the foregoing technical solutions, when reverse powering equipment supplies power resources on a line, the reverse powering equipment detects whether a user terminal exists on the line, generates an alarm signal once detecting that a user terminal exists, and does not normally supply power until the user terminal is removed from the line.

BRIEF DESCRIPTION OF THE DRAWINGS

To describe the technical solutions in the embodiments of the present invention more clearly, the following briefly describes the accompanying drawings required for describing the background and the embodiments. Apparently, the accompanying drawings in the following description show merely some embodiments of the present invention, and a person of ordinary skill in the art may still derive other accompanying drawings or embodiments according to these drawings or description without creative efforts, and the present invention aims to cover all these derived accompanying drawings or embodiments.

DETAILED DESCRIPTION

To make the objectives, technical solutions, and advantages of the present invention clearer and more comprehensible, the following further describes the present invention in detail with reference to the accompanying drawings and embodiments. It should be understood that the specific embodiments described herein are merely used to explain the present invention but are not intended to limit the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
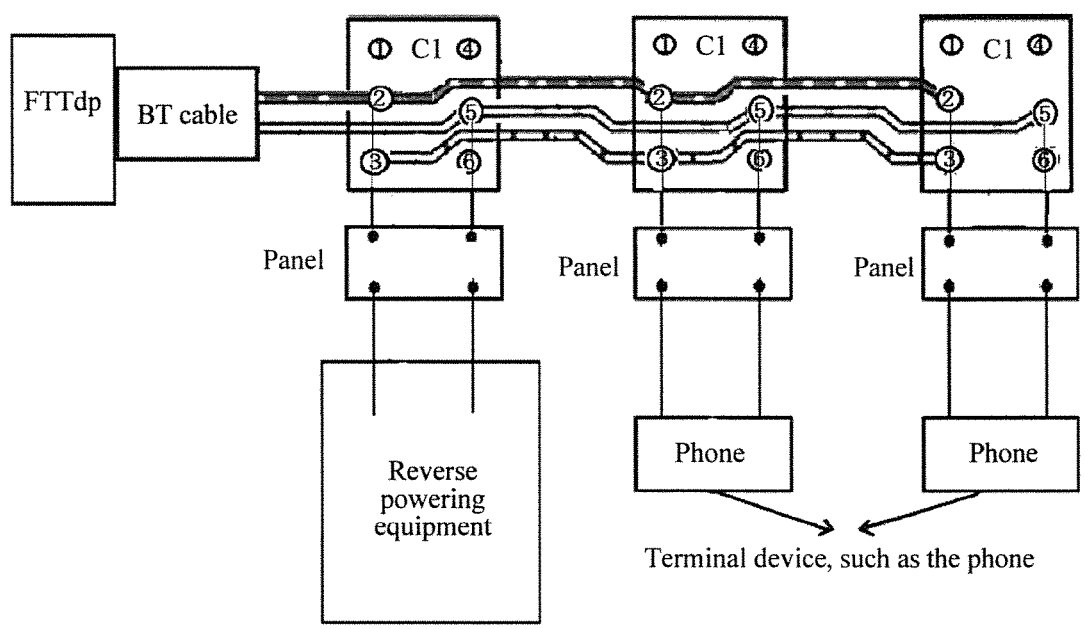
FIG. 1 is a schematic diagram of a reverse power supply line in an FTTdp network.

FIG. 1 is a diagram of a specific application scenario according to an embodiment of the present invention. As shown in FIG. 1, in a cabling environment in a home, there are multiple panel interfaces (three panel interfaces are exemplarily shown in FIG. 1), which are marked as interface 1, interface 2 and interface 3. Any one of the panel interfaces is connected to reverse powering equipment (the interface 1 is connected in FIG. 1), and supplies power to a distribution point unit by using a line. The distribution point unit here may be a fiber to the distribution point (FTTdp) device, and may also be referred to as a line distribution box, and a twisted pair cable is used for the line here.

Figure 2:
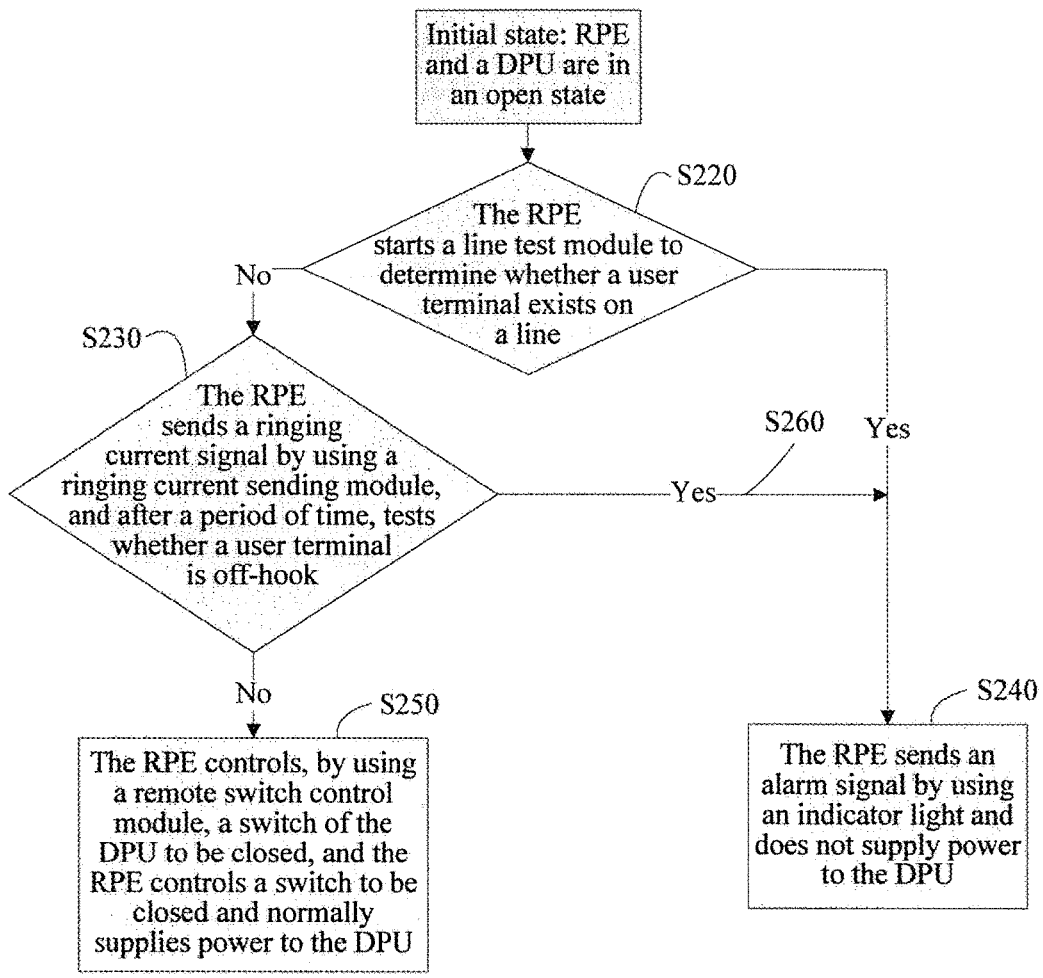
FIG. 2 is a schematic flowchart of a reverse power supply method according to an embodiment of the present invention.

An embodiment of the present invention provides a reverse power supply method, as shown in FIG. 2:

S220: Reverse powering equipment starts a line test module to determine whether a user terminal device exists on a line.

Before the reverse powering equipment starts the line test module, the reverse powering equipment starts a distribution point unit and opens a switch of power supply equipment, so that a power supply system is in a non-power supply state. The reverse powering equipment determines whether a user terminal device exists on the line, where the user terminal device here may be a phone, the line here may be connected by using a twisted pair cable, and a determining manner here may be testing whether a capacitance on the line reaches a critical value. If it is found through test whether the capacitance on the line exceeds the critical value, it is considered that a user terminal device possibly exists on the line. The capacitance critical value here may be greater than 1 µF (microfarad) for reference, that is, if it is tested that a capacitance value on the line is greater than 1 µF, it is speculated that a user terminal device exists on the line.

Optionally, the determining manner here may be testing whether a resistance on the line reaches a critical value. If it is found through test whether the resistance on the line exceeds the critical value, it is considered that a user terminal device possibly exists on the line. The resistance critical value here may be greater than 300 ohms for reference, that is, if it is tested that a resistance value on the line is greater than 300 ohms, it is speculated that a user terminal device exists on the line.

S230: If it is speculated that no user terminal device exists on the line, the reverse powering equipment sends a ringing current signal by using a ringing current sending module, and after a period of time, detects whether a user terminal is off-hook.

If it is tested that the capacitance value on the line is less than 1 µF, it is speculated that no user terminal device exists on the line. Optionally, the reverse powering equipment sends the ringing current signal on the line, where the ringing current signal here may be a ringing tone of a phone, and a frequency of the ringing current signal may be 25 HZ, and after a period of time, where the period of time here may be a time greater than one second, detects whether a user terminal device is in an off-hook state, where the user terminal device here may be a phone, and the off-hook state here may be a user's behavior of answering a call at home.

S240: If it is speculated that a user terminal device exists on the line, the reverse powering equipment sends an alarm signal by using an indicator and cannot supply power to a distribution point unit, where the alarm signal here is used to prompt a user to disconnect the user terminal.

If it is tested that the capacitance value on the line is greater than 1 μF, the reverse powering equipment sends the alarm signal, where the alarm signal here may be turning on the indicator or another alarm manner may be used. In this case, the reverse powering equipment does not supply power to the distribution point unit. When the user disconnects the user terminal after receiving the alarm signal, the reverse powering equipment normally supplies power to the distribution point unit.

S250: If the reverse powering equipment finds that no user terminal is off-hook, the reverse powering equipment controls, by using a remote switch control module, a switch of the distribution point unit to be closed, and the reverse powering equipment controls a local switch to be closed and supplies power to the distribution point unit.

After a period of time when the reverse powering equipment sends the ringing current signal, where the period of time here is generally a proper period of time token by the user to answer a call after hearing a phone ringing, if no off-hook behavior is performed finally, the reverse powering equipment supplies power to the distribution point unit.

S260: If the reverse powering equipment finds that a user terminal is off-hook, the reverse powering equipment cannot supply power to the distribution point unit until disconnecting the user terminal by sending an alarm signal, where the alarm signal here prompts the user to disconnect the phone.

In this step, after the reverse powering equipment sends the ringing current signal, if a user terminal is off-hook, the reverse powering equipment sends the alarm signal, where the alarm signal here may be sent by using an indicator or another manner may be used. In this case, the reverse powering equipment does not supply power to the distribution point unit.

According to the foregoing technical solution, when reverse powering equipment supplies power resources on a line, the reverse powering equipment detects whether a user terminal exists on the line, generates an alarm signal once detecting that a user terminal exists, and does not normally supply power until the user terminal on the line is removed, which prevents the user terminal from being damaged.

Figure 3:
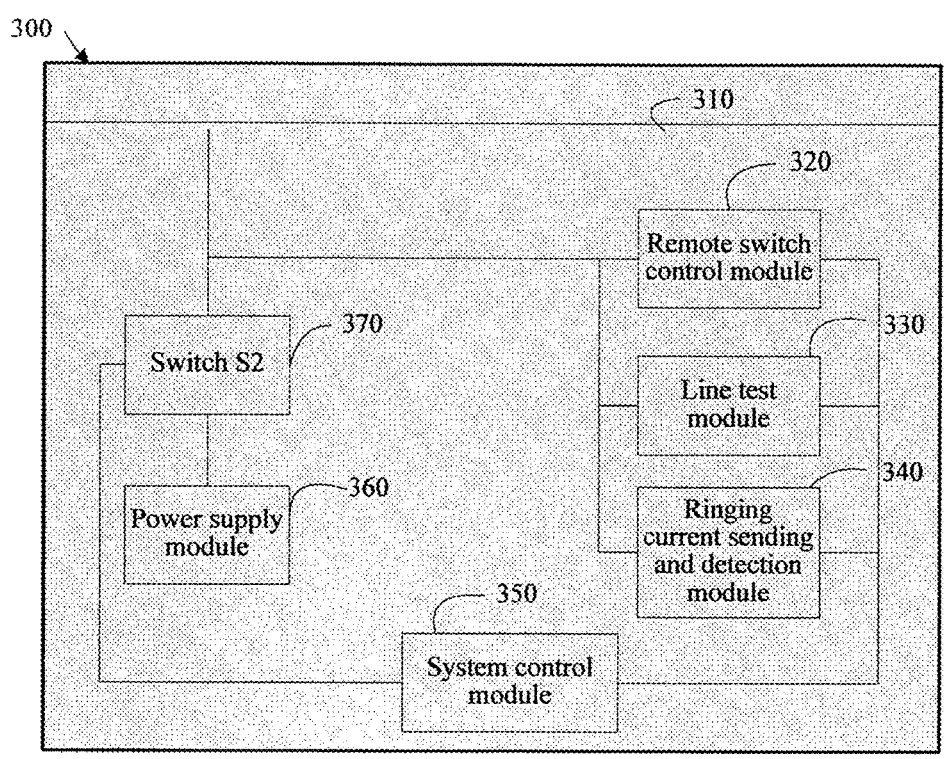
FIG. 3 is a schematic diagram of modules of reverse powering equipment according to an embodiment of the present invention.

An embodiment of the present invention further provides reverse powering equipment. As shown in FIG. 3, the reverse powering equipment 300 includes a line 310, a remote switch control module 320, a line test module 330, a ringing current sending and detection module 340, a system control module 350, a power supply module 360, and a switch S2 370, where the power supply module 360 has an end connected to the switch S2 370, the remote switch control module 320 has an end connected to the line 310 and an end connected to the system control module 350, the line test module 330 has an end connected to the line 310 and an end connected to the system control module 350, and the ringing current sending and detection module 340 has an end connected to the line 310 and an end connected to the system control module 350, where the line 310 is configured to connect modules in the reverse powering equipment 300;

the remote switch control module 320 is configured to control a switch of a distribution point unit;

the line test module 330 is configured to test whether a user terminal exists on the line 310, which may test whether a capacitance value or a resistance value reaches a critical value, and if the critical value is reached, speculate that a user terminal exists on the line, and in this case, instruct the system control module 350 to send an alarm signal, where the critical value here may be 1 microfarad for reference if the capacitance value is tested, or may be 300 ohms for reference if the resistance value is tested;

the ringing current sending and detection module 340 is configured to: when the line test module 330 speculates that no user terminal exists on the line 310, send a ringing current signal on the line 310, and detect whether a terminal on the line 310 is in use; after a proper period of time, if a user responds to the ringing current signal, consider that a user terminal exists on the line, where in this case, the system control module 350 sends an alarm signal, and the reverse powering equipment cannot supply power on the line 310; and after a proper period of time, if no user responds to the ringing current signal, consider that no user terminal exists on the line, where in this case, the reverse powering equipment may close the switch S2 370 by using the system control module 350, and control, by using the remote switch control module 320, a switch of the distribution point unit to be closed, so that the power supply module 360 can supply power resources to the distribution point unit, where the proper period of time here may be a period of time usually token by the user after hearing a phone ringing; and a frequency of the ringing current signal here may be 25 HZ;

the system control module 350 is configured to send an alarm signal when the line test module determines that a user terminal exists on the line, which may be further configured to: when the ringing current sending and detection module 340 determines that no user terminal exists on the line, control the switch S2 370 to be closed, so that the power supply module 360 supplies power resources on the line 310;

the power supply module 360 is configured to supply a reverse voltage and current on the line 310; and the switch S2 370 is configured to control whether power is supplied on the line 110.

According to the foregoing technical solution, when reverse powering equipment supplies power resources on a line, the reverse powering equipment detects whether a user terminal exists on the line, generates an alarm signal once detecting that a user terminal exists, and does not normally supply power until the user terminal on the line is removed, which prevents the user terminal from being damaged.

Figure 4:
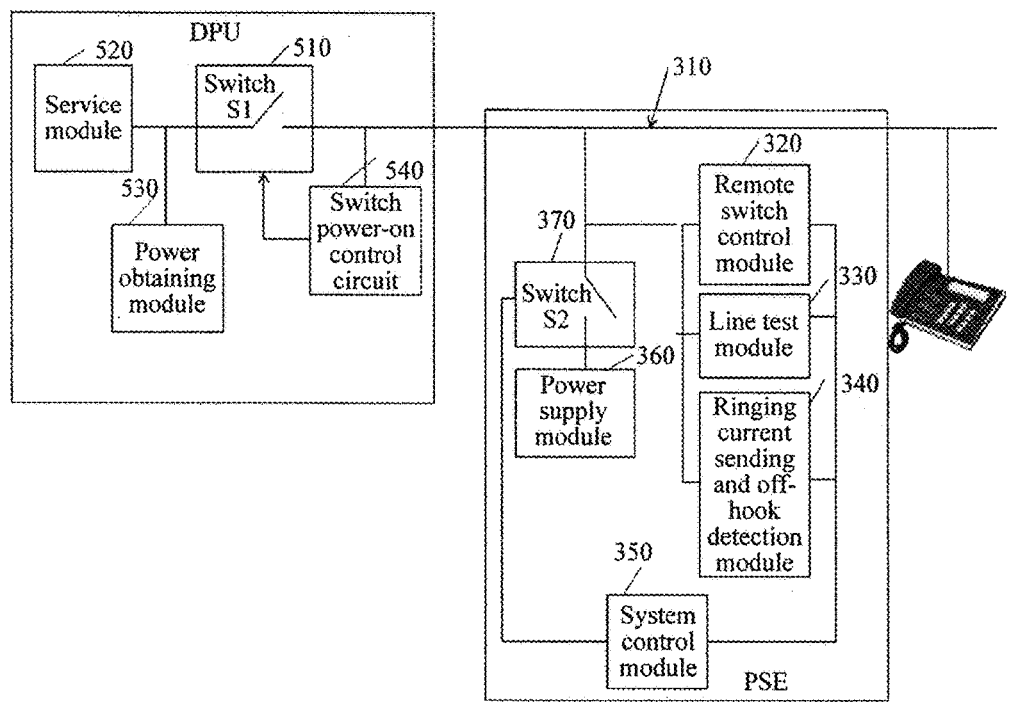
FIG. 4 is a schematic diagram of a reverse power supply system according to an embodiment of the present invention.

An embodiment of the present invention further provides a reverse power supply system. As shown in FIG. 4, the reverse power supply system includes a distribution point unit (Distribution Point Unit, DPU for short) and reverse powering equipment (RPE for short), where the DPU and the RPE are connected by using a twisted pair cable. The DPU includes a line 310, a switch S1 510, a service module 520, a power obtaining module 530, and a switch power-on control circuit 540, where the service module has an end connected to the line 310, the power obtaining module has an end connected to the line 310, the switch power-on control circuit 540 has an end connected to the switch S1 510 and an end connected to the line 310, and is configured to control the switch S1 to be opened or closed, and the switch power-on control circuit 540 is controlled by a remote switch control module 320 of the reverse powering equipment 300. The RPE includes a line 310, the remote switch control module 320, a line test module 330, a ringing current sending and detection module 340, a system control module 350, a power supply module 360, and a switch S2 370, where the power supply module 360 has an end connected to the switch S2 370, the remote switch control module 320 has an end connected to the line 310 and an end connected to the system control module 350, the line test module 330 has an end connected to the line 310 and an end connected to the system control module 350, and the ringing current sending and detection module 340 has an end connected to the line 310 and an end connected to the system control module 350. The reverse power supply system is further described in the following by using a specific scenario, including:

Step 1: No power is supplied to the DPU, and the switch S1 is in an open state.

Step 2: After the RPE is powered on, the switch S2 370 in an open state.

Step 3: The RPE starts the line test module 330 to determine whether a user terminal, such as a phone, exists on the line 310.

Step 4: If it is found through test whether a user terminal exists, the RPE sends an alarm signal by using the system control module 350 and does not supply power to the DPU until a user disconnects the user terminal: the phone, the system control module 350 controls the switch S2 to be closed and instructs the remote switch control module 320 to close the switch S1 520, the reverse powering equipment 300 supplies power normally, the DPU can obtain power normally, and the service module 520 is run normally.

Step 5: If it is found through test whether no user terminal exists, the RPE starts the ringing current module 340 to send a ringing current signal, after a period of time, detects whether a user responds to the ringing current signal, that is, whether a user answers a call, and if yes, considers that a user terminal exists on the line 310, send an alarm in a manner in step 4, and does not supply power to the DPU.

Step 6: If no user answers a call, the RPE controls, by using the remote switch control module 320, the switch S1 of the DPU to be closed, and the RPE controls the switch S2 to be closed, so that the RPE supplies power normally, the DPU obtains power normally, and the service module 520 is normal.

According to the foregoing technical solution, when reverse powering equipment supplies power resources on a line, the reverse powering equipment detects whether a user terminal exists on the line, generates an alarm signal once detecting that a user terminal exists, and does not normally supply power until the user terminal is removed from the line, which prevents the user terminal from being damaged.

Although the present invention is described above with reference to the specific implementation manners of the present invention, these descriptions should not be considered as a limitation to the present invention. Any modifications and changes without departing from the spirit and scope of the present invention all fall within the scope of the present invention defined by the appended claims.

What is claimed is:

1. Reverse powering equipment for use when a reverse power supply is provided to a distribution point unit in a fiber to the distribution point network environment, the reverse powering equipment comprising:
  a line, a power supply module, a switch, a line test module, and a system control module, wherein:
  the line is configured to connect the reverse powering equipment and the distribution point unit, the switch has an end connected to the line, an end connected to the system control module, and an end connected to the power supply module, the power supply module has an end connected to the switch, and the line test module has an end connected to the line and an end connected to the system control module;
  the power supply module is configured to supply power to the distribution point unit by using the line;
  the switch is configured to control whether the power supply module supplies power;
  the line test module is configured to: when the switch is opened and the power supply module does not supply power, test whether a user terminal is connected to the line; and
  the system control module is configured to send an alarm signal when the line test module determines that a user terminal exists on the line, and after a user disconnects the user terminal, control the switch to be closed and the power supply module to supply power.

2. The reverse powering equipment according to claim 1, wherein the system control module is further configured to:
  when the line test module determines that no user terminal exists on the line, control the switch to be closed and the power supply module to supply power.

3. The reverse powering equipment according to claim 1, wherein the reverse powering equipment further comprises:
  a ringing current test module, configured to: when the line test module determines that no user terminal exists on the line, send a ringing current signal on the line.

4. The reverse powering equipment according to claim 3, wherein the system control module is further configured to:
  when no response to the ringing current signal sent by the ringing current test module is obtained, control the switch to be closed and the power supply module to supply power.

5. The reverse powering equipment according to claim 3, wherein the system control module is further configured to:
  when a response to the ringing current signal sent by the ringing current test module is obtained, after the user disconnects the user terminal, control the switch to be closed and the power supply module to supply power.

6. The reverse powering equipment according to claim 1, wherein the reverse powering equipment further comprises:
  a remote switch control module, configured to control the distribution point unit to obtain power from the line.

7. A reverse power supply method for use in a reverse power supply system, wherein the reverse power supply system comprises reverse powering equipment electrically connected to a distribution point unit by using a line, the method comprising:
  sending, by the reverse powering equipment, an alarm signal when the reverse powering equipment determines that a user terminal exists on the line;
  skipping, by the reverse powering equipment, performing power supply; and
  performing, by the reverse powering equipment, power supply on the line when the reverse powering equipment determines that no user terminal exists on the line.

8. The method according to claim 7, wherein performing, by the reverse powering equipment, power supply on the line when the reverse powering equipment determines that no user terminal exists on the line comprises:
  when the reverse powering equipment detects that no user terminal exists on the line, sending, by the reverse powering equipment, a ringing current signal on the line; and
  when no response to the ringing current signal sent by the reverse powering equipment is obtained, performing, by the reverse powering equipment, power supply.

9. The method according to claim 8, further comprising:
  when a response to the ringing current signal sent by the reverse powering equipment is obtained, skipping, by the reverse powering equipment, performing power supply, and after a user disconnects the user terminal, performing, by the reverse powering equipment, power supply.

10. A reverse power supply system, comprising:

reverse powering equipment comprising a first switch, a power supply module, a system control module, a remote switch control module, a line detection module, and a ringing current detection module;

a distribution point unit comprising a second switch, a power obtaining module, a service module, and a switch power-on control circuit, wherein the reverse powering equipment is connected to the distribution point unit by using a line, wherein:

the power supply module is configured to supply power resources to the distribution point unit by using the line, and the first switch is configured to control whether the power supply module supplies power;

a line test module configured to: when the switch is opened and the power supply module does not supply power, test whether a user terminal is connected to the line;

wherein the system control module is configured to send an alarm signal when the line test module determines that a user terminal exists on the line, and after a user disconnects the user terminal, control the switch to be closed and the power supply module to supply power; and wherein the second switch is configured to control the power obtaining module to obtain power from the line, the service module is configured to implement a service function of the distribution point unit, the switch power-on control circuit is configured to control the second switch to be closed or opened, and the switch power-on control circuit is controlled by the remote switch control module of the reverse powering equipment.

* * * * *